(12) United States Patent
Jones et al.

(10) Patent No.: US 7,823,954 B2
(45) Date of Patent: Nov. 2, 2010

(54) SLIDABLE VISOR ASSEMBLY

(75) Inventors: Bryan T. Jones, Holland, MI (US); Stacy G. Frye, Holland, MI (US); Philip A. Lehman, West Olive, MI (US); Kirk J. Olep, Hudsonville, MI (US); Thomas S. Hodgson, Holland, MI (US); Kenneth D. Kreuze, Holland, MI (US); Ronald C. Perry, Jenison, MI (US); Vincent J. Boraas, Jr., Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 110 days.

(21) Appl. No.: 12/000,095

(22) Filed: Dec. 7, 2007

(65) Prior Publication Data

US 2008/0211256 A1   Sep. 4, 2008

Related U.S. Application Data

(60) Provisional application No. 60/873,790, filed on Dec. 8, 2006.

(51) Int. Cl.
*B60J 3/02* (2006.01)
(52) U.S. Cl. ................. 296/97.11; 296/97.12
(58) Field of Classification Search ............... 296/97.1, 296/97.11, 97.9, 97.12, 97.13; 160/DIG. 3
See application file for complete search history.

(56) References Cited

U.S. PATENT DOCUMENTS

| | | | | |
|---|---|---|---|---|
| 2,221,182 A * | 11/1940 | Davies | ................... | 296/97.11 |
| 5,139,303 A * | 8/1992 | Miller | ................... | 296/97.9 |
| 5,934,734 A * | 8/1999 | Wilson | ................... | 296/97.11 |
| 6,007,135 A * | 12/1999 | Alves | ................... | 296/97.9 |
| 6,010,175 A * | 1/2000 | Bodar et al. | ................... | 296/97.11 |
| 6,296,293 B1 * | 10/2001 | Peterson et al. | ................... | 296/97.11 |
| 6,698,815 B1 * | 3/2004 | Mills et al. | ................... | 296/97.2 |
| 6,923,490 B2 * | 8/2005 | Peterson et al. | ................... | 296/97.11 |
| 7,000,972 B2 * | 2/2006 | Asai | ................... | 296/97.11 |
| 7,055,884 B2 * | 6/2006 | Zapinski et al. | ................... | 296/97.11 |
| 7,090,281 B2 * | 8/2006 | Davey et al. | ................... | 296/97.11 |
| 7,461,886 B1 * | 12/2008 | Wang et al. | ................... | 296/97.11 |
| 2004/0145209 A1 * | 7/2004 | Peterson et al. | ................... | 296/97.11 |
| 2005/0200155 A1 * | 9/2005 | Asai | ................... | 296/97.13 |
| 2005/0225114 A1 * | 10/2005 | Davey et al. | ................... | 296/97.11 |
| 2006/0138799 A1 * | 6/2006 | Wang et al. | ................... | 296/97.11 |
| 2006/0267369 A1 * | 11/2006 | Kearns et al. | ................... | 296/97.12 |
| 2008/0093876 A1 * | 4/2008 | Olep et al. | ................... | 296/97.11 |
| 2009/0134657 A1 | 5/2009 | Asai | | |

FOREIGN PATENT DOCUMENTS

JP            405286362 A   *   11/1993

OTHER PUBLICATIONS

Machine translation of JP405286362.*

* cited by examiner

*Primary Examiner*—Jason S Morrow
(74) *Attorney, Agent, or Firm*—Foley and Lardner LLP

(57) ABSTRACT

A visor assembly includes a visor body, a support rod, and a slide mechanism coupled to the visor body that slidably engages the support rod. The slide mechanism includes a slide member having a plurality of extensions that are biased toward the support rod.

17 Claims, 3 Drawing Sheets

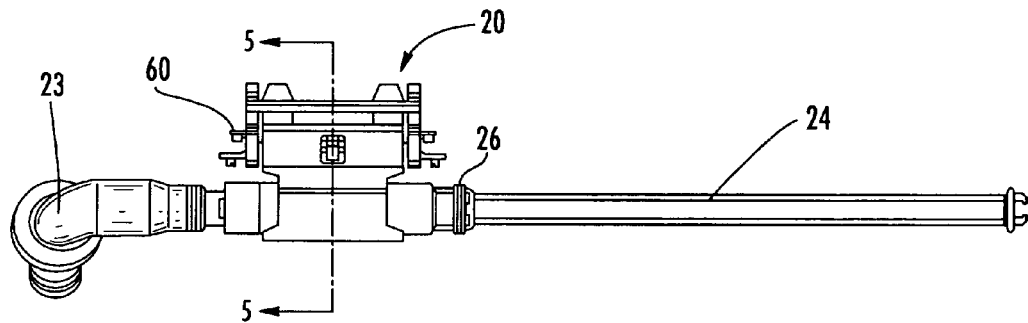
FIG. 4
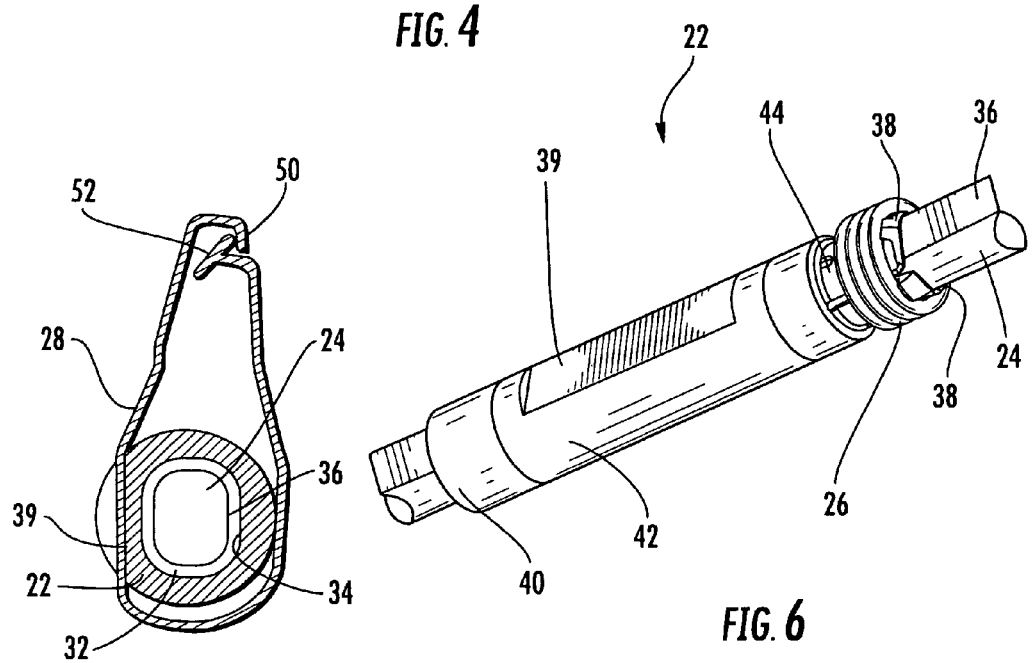
FIG. 5
FIG. 6
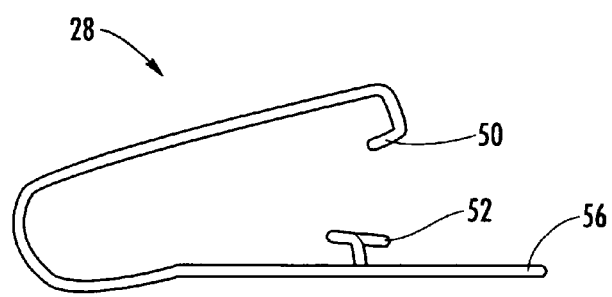
FIG. 7

SLIDABLE VISOR ASSEMBLY

CROSS-REFERENCE TO RELATED PATENT APPLICATIONS

The present application claims priority from U.S. Provisional Application No. 60/873,790, filed Dec. 8, 2006, which is incorporated herein by reference in its entirety.

BACKGROUND

The present invention relates generally to the field of visors used in vehicles, and more specifically, to a slidable visor assembly having a slide device or mechanism for permitting a visor to be slidably positioned along a support structure, such as a support rod.

Visors for vehicles are generally known. Typically, visors may be adjusted between a variety of positions, for example, by rotating a visor between a "stowed" position and a "use" position. Visors may further be adjustable laterally (e.g., in a sliding manner) along all or a portion of the length of a support feature. Conventional visors present challenges with respect to providing easy adjustments yet preventing inadvertent or unintentional movements.

Accordingly, it would be desirable to provide a visor assembly that permits a user to easily adjust the position of the visor along a length of a support structure. It would also be desirable to provide a visor assembly that resists unintentional or undesired movement of the visor along a support structure once the visor is in a desired position. Accordingly, it would be advantageous to provide a visor assembly and/or a slide device or mechanism for a visor assembly having one or more of these advantageous features.

SUMMARY

One embodiment relates to a visor assembly comprising a visor body, a support rod, and a slide mechanism coupled to the visor body that slidably engages the support rod, wherein the slide mechanism comprises a slide member having a plurality of extensions that are biased toward the support rod.

Another embodiment relates to a visor assembly comprising a visor body, a support member, and a slide mechanism coupled to the visor body configured to permit the visor body to slide along at least a portion of the support member, wherein the slide mechanism comprises a biasing member configured to bias at least a portion of the slide mechanism toward the support member.

Yet another embodiment relates to a slide mechanism for a visor comprising a slide member configured to slidably engage a support for a visor, and a housing configured to couple the slide member to a visor, wherein the slide member comprises at least one projection that is biased toward the support by a biasing member.

BRIEF DESCRIPTION OF THE DRAWINGS

FIG. 4 is a side view of a portion of a visor assembly according to an exemplary embodiment.

FIG. 5 is a cross-sectional view of a portion of a visor assembly taken along line 5-5 of FIG. 4 according to an exemplary embodiment.

FIG. 6 is a perspective view of a portion of a visor assembly according to an exemplary embodiment.

FIG. 7 is a side view of a portion of a visor assembly according to an exemplary embodiment.

DETAILED DESCRIPTION

Figure 1:
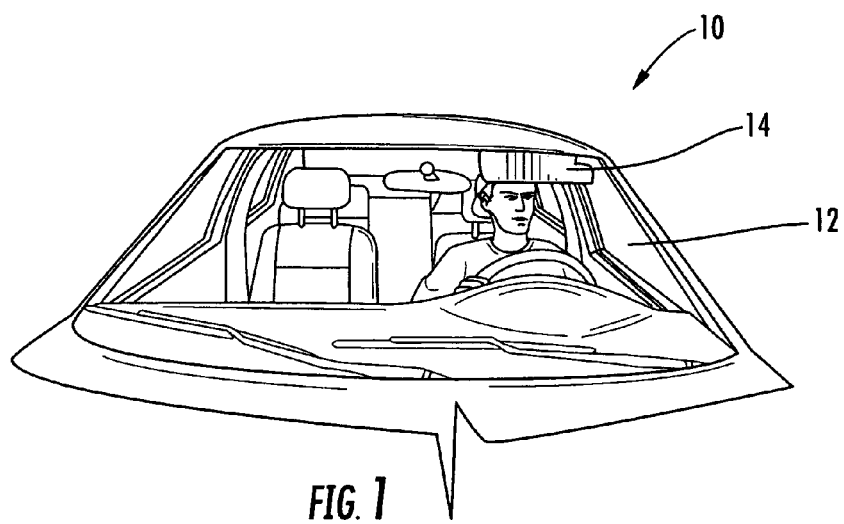
FIG. 1 is a perspective view of a vehicle according to an exemplary embodiment.

Referring to FIG. 1, a vehicle 10 is shown according to an exemplary embodiment and includes an interior 12. Vehicle 10 may be any of a variety of different types of vehicles, including automobiles, recreational vehicles, buses, airplanes, etc. According to an exemplary embodiment, vehicle 10 is an automobile. As shown in FIG. 1, interior 12 is provided with a visor assembly 14. Visor assembly 14 may be secured to an overhead portion of interior 12 of vehicle 10, or provided at any suitable location within vehicle 10.

Figure 2:
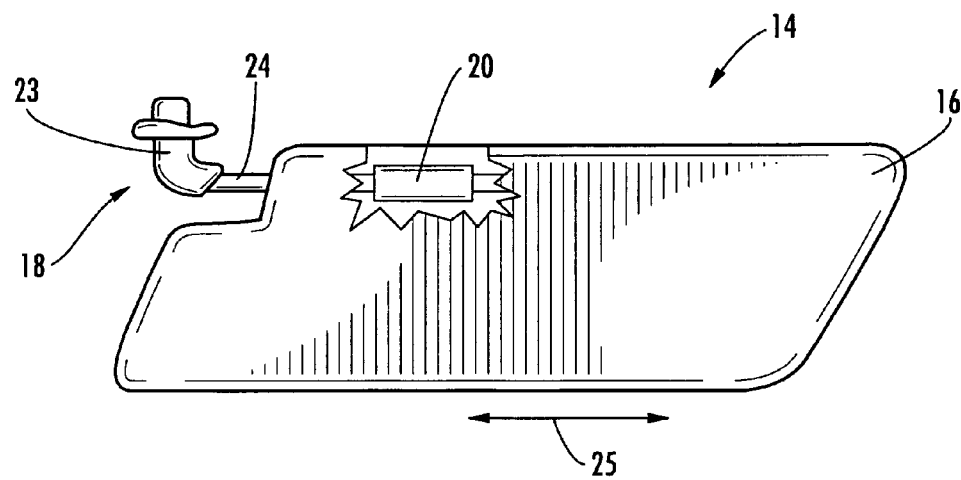
FIG. 2 is a perspective view of a visor assembly according to an exemplary embodiment.

Referring to FIG. 2, visor assembly 14 is shown according to an exemplary embodiment. Visor assembly 14 includes a visor 16, a support 18, and a slide mechanism 20. Support 18 has a mounting portion 23 that permits support 18 to be mounted to vehicle 10 (e.g., at an overhead location) and a support rod or member 24 that engages slide mechanism 20. Slide mechanism 20 is provided within visor 16 and permits visor 16 to slide along at least a portion of the length of support rod 24 in the direction represented by arrow 25.

Figure 3:
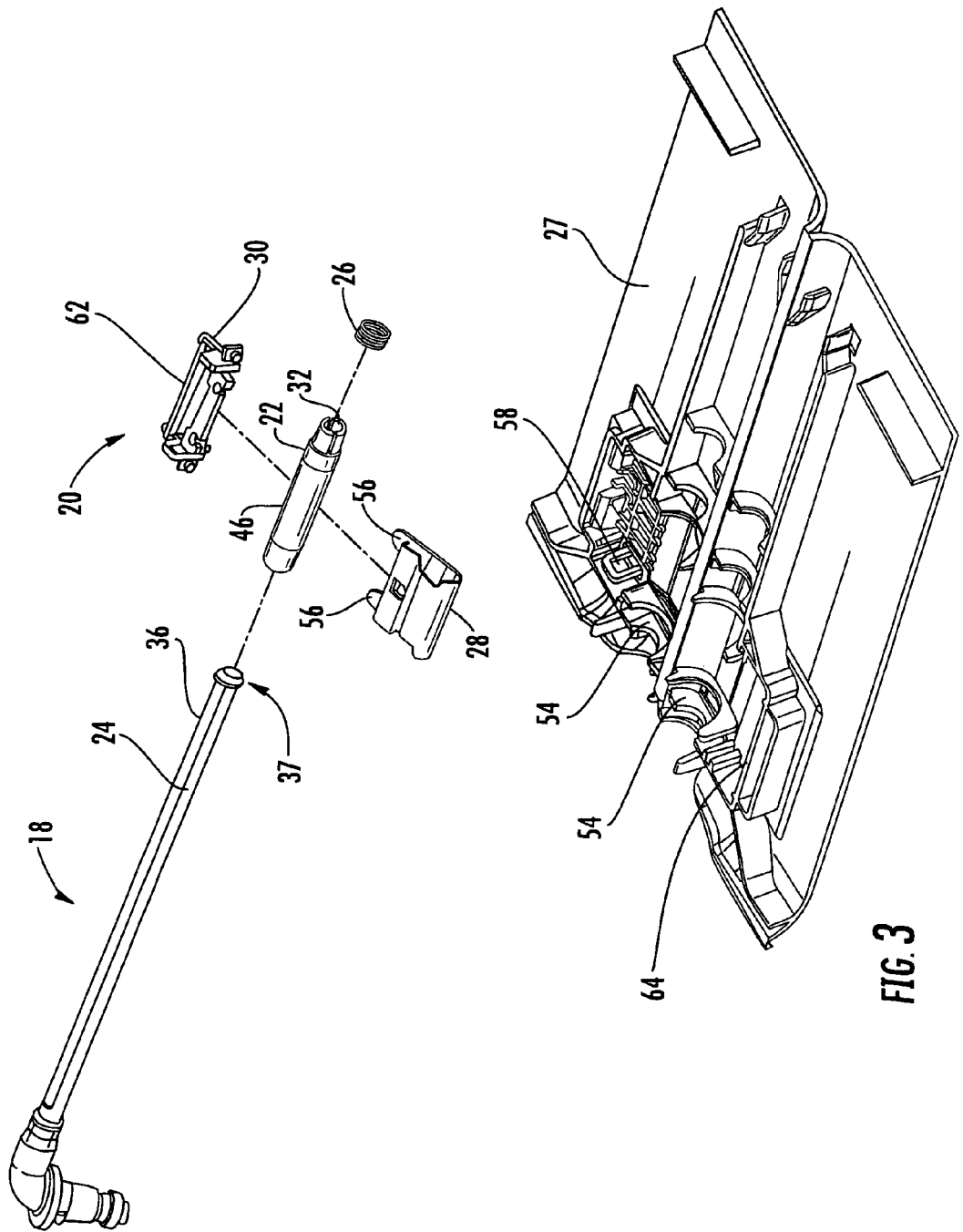
FIG. 3 is a partial exploded view of a visor assembly according to an exemplary embodiment.

Referring to FIGS. 3 and 4, a portion of visor assembly 14 is shown in greater detail according to an exemplary embodiment. As shown in FIG. 3, slide mechanism 20 may include a bushing or slide member 22, a biasing member or spring 26, a detent spring 28, and a carrier or housing 30. Slide member 22 is configured to slidably receive support rod 24. According to an exemplary embodiment, slide member 22 includes an inner aperture 32 within which support rod 24 may slide. As best shown in FIG. 5, an inner flat portion 34 (a keyed portion, etc.) defines at least a portion of aperture 32 and is configured to interface with a corresponding flat or keyed portion 36 on support rod 24. As shown in FIG. 6, support rod 24 may have a generally circular cross-section except for flat portion 36. Flat portion 36 is intended to prevent rotation of support rod 24 within and with respect to slide member 22, such that support rod 24 slidably engages the interior of slide member 22, but does not rotate with respect to slide member 22 (i.e., slide member 22 and support rod 24 may be rotationally fixed with respect to rotational movement about the longitudinal axis of support rod 24).

While support rod 24 is shown having a generally circular cross-section (except for flat portion 36), any suitable cross-sectional shape (e.g., square, rectangular, splined, etc.) may be used. Further, support rod 24 may be made of any suitable material (e.g., plastic, metal, etc.) and be of any length that provides the desired sliding adjustability for visor assembly 14. According to an exemplary embodiment, support rod 24 may be made from a chrome material.

Slide member 22 permits rotation of visor 16 (and detent spring 28) about support rod 24. Detent spring 28 is housed within housing 30, which is in turn mounted to a visor core 27. Visor core 27 may be made in any suitable or conventional way, for example, from a two-piece "butterfly" type core section wrapped in a fabric. According to various other exemplary embodiments, other types of visor bodies may alternatively be used. In use, a vehicle occupant may grasp visor assembly 14 and rotate it about support rod 24 between a stowed position and a number of use positions. As visor assembly 14 is rotated, detent spring 28 and housing 30 also rotate about support rod 24 and slide member 22 (which are rotationally fixed relative to each other). As discussed in greater detail below, detent spring 28 acts to rotate visor assembly 14 to the stowed position once visor assembly 14 is moved to a predetermined angular position relative to the stowed position.

Slide member 22 may have a generally cylindrical exterior and may include an exterior flat 39 (see FIG. 5) that extends along all or a part of the exterior surface of slide member 22. Flat 39 of slide member 22 is configured to coact with detent spring 28, for example, to actuate visor assembly 14 into the "stowed" position upon the visor reaching a certain position. According to one embodiment visor 16 and detent spring 28 rotate about slide member 22 and support rod 24, which remain rotationally fixed relative to each other.

According to an exemplary embodiment, slide member 22 includes one or more longitudinally-extending projections, or fingers 38, that extend from one or both ends of slide member 22 and at least partially conform to the exterior of support rod 24. Projections 38 may be resiliently designed such that they may be biased (bent, formed, etc.) in a direction normal to the exterior surface of support rod 24. At least a portion of the interior surfaces of projections 38 may contact the outer surface of support rod 24, thereby generating a frictional force between support rod 24 and slide member 22 that resists relative sliding motion between the two components during use of the visor. According to an exemplary embodiment, projections 38 are configured such that they provide a normal force on the exterior of support rod 24 without the need for additional springs or other biasing devices (such as spring 26). For example, projections 38 may be directed inward toward the longitudinal axis of slide member 22, such that projections 38 must be deflected outward in order for support rod 24 to be slid into the interior of slide member 22. The resiliency of projections 38 creates a bias force against the exterior surface of support rod 24, thereby providing the appropriate amount of frictional resistance and "feel" for the sliding action of visor assembly 14.

According to an exemplary embodiment, slide mechanism 20 also includes spring 26, shown as a coil spring. Spring 26 may be mounted in a recess 44 provided on projections 38 of slide member 22. According to other exemplary embodiments, the thickness of the wire that makes up the spring may be increased/decreased, or thickness of projections 38 may be increased/decreased, to increase or decrease the frictional force. Alternatively, spring 26 may be secured to projections 38 using any suitable method. Spring 26 may be sized such that it provides an appropriate bias force upon projections 38 toward support rod 24. The normal force of projections 38 upon support rod 24 generated by spring 26 may be adjusted by varying the configuration of spring 26, e.g., the number of coils in spring 26. In this manner, the frictional force between projections 38 and support rod 24 (being a function of the normal force exerted by projections 38 on support rod 24) may likewise be adjusted, or "dialed in," for example, by increasing or decreasing the number of coils in spring 26, thereby allowing visor assembly 14 to have the proper "feel" when being adjusted along the length of support rod 24. According to an exemplary embodiment, rather than increasing or decreasing the number of coils in spring 26, the spring force may be adjusted by increasing or decreasing the diameter of spring 26, providing an alternative way to adjust the frictional force between support rod 24 and slide member 22. According to other exemplary embodiments, the frictional force may also be adjusted by increasing/decreasing the diameter of the spring wire or the thickness of projections 38. Spring 26 may be made of any suitable material and by any conventional process. While the various exemplary embodiments illustrated herein are shown with a coil spring, any other suitable spring type or form may be used that provides the appropriate bias force upon projections 38 toward support rod 24.

As shown in the FIGURES, slide member 22 may have projections 38 and spring 26 located at one end. According to various alternative embodiments, projections 38 and or spring 26 may be provided at both ends, or at intermediate locations along the length of, slide member 22. Further, spring 26 may be made of any suitable material, and the configuration of spring 26 and projections 38 may be adjusted to suit various cross-sectional shapes, thicknesses, contours, etc. of slide member 22 and support rod 24.

According to an exemplary embodiment, slide member 22 may have a one-piece body portion 46, made of any suitable material (e.g., metal, plastic, etc.). According to one exemplary embodiment, body portion 46 is made of an acetal or other polymer material such as CELCON®. According to another exemplary embodiment, shown in FIG. 6, slide member 22 may have a two-piece body, consisting of a first or an inner piece 42 and a second or outer piece 40. Second piece 40 may be made of a material suitable to slidably engage support rod 24 (e.g., an acetal material), and first piece 42 may be made of a material suitable to rotatably engage detent spring 28 (e.g., steel, etc.). First and second pieces 42, 40 may be joined together using any suitable process, including injection molding, co-molding, insert-molding, or using a variety of other techniques (e.g., press-fit, snap fit, etc.) or devices (adhesives, mechanical fasteners, etc.). According to an exemplary embodiment, second 40 piece is made of an acetal or other polymer material such as CELCON®, and first piece 42 is made of a suitable metal material such as steel. Second piece 40 may be injection-molded around portions of first piece 42. Other materials suitable for the intended applications may alternatively be used, and slide member 22 may be made up of more or fewer components than described herein, with the components being joined using any materials or methods described herein or any other suitable means.

Referring to FIG. 5, slide member 22 is positioned within detent spring 28 such that detent spring 28 (and in turn visor 16) rotates (i.e., "self-actuates") into a stowed position once the exterior flat 39 of slide member 22 is rotated into a predetermined position (e.g., relative to the stowed position). According to an exemplary embodiment, a dry lubricant such as a dry lube grease (e.g., teflon, etc.) may be applied to detent spring 28 to reduce the frictional interface between detent spring 28 and slide member 22. According to one embodiment of the invention, detent spring 28 is fixed relative to visor 16. Detent spring 28 then rotates, but does not move along the longitudinal axis of, slide member 22, and slide member 22 may slide relative to support rod 24. As shown in FIG. 3, support rod 24 may include a deformed portion 37 (e.g., an enlarged, shaped, or otherwise configured portion) that prevents slide member 22 from sliding beyond the end of support rod 24.

According to an exemplary embodiment, shown in FIG. 7, detent spring 28 may include a tab or hook 50 and a corresponding extension 52 (e.g., projection, lip, etc.) configured such that detent spring 28 may be placed around slide member 22 and/or secured in place by positioning (e.g., snapping, pressing, etc.) tab 50 over extension 52 (see, e.g., FIG. 5). Tab 50 and extension 52 may be of any size and/or shape that provides a secure fit, and may be positioned at various locations on detent spring 28. According to another embodiment, tab 50 and extension 52 of detent spring 28 are positioned such that detent spring 28 is fitted around at least a portion of housing 30 or visor 16 prior to being secured. Other means of securing detent spring 28 relative to slide member 22 may alternatively be used.

Referring to FIG. 4, housing 30 may support or mount slide member 22 and/or detent spring 28 within visor 16, and may include one or more supports, or cradles 54, that facilitate the rotation of detent spring 28 and visor 16 about slide member 22 and support rod 24. According to various alternative embodiments, the profiles of cradles 54 may be adjusted accordingly to provide the proper support for slide member 22 and/or support rod 24 and to accommodate various sizes of slide members and/or support rods. As shown in FIG. 3, detent spring 28 may also have two extended portions 56 that engage housing 30 and transfer any detent spring forces to visor 16. Extended portions 56 may also be used to secure detent spring 28 to housing 30. Housing 30 may be mounted to the interior of visor 16 via any suitable means (e.g., injection molding, thermoforming, adhesives, mechanical fasteners, etc.). According to an exemplary embodiment shown in FIGS. 3 and 4, housing 30 includes one or more extensions 60 (tabs, etc.) that engage apertures 58 provided in visor core 27.

According to various exemplary embodiments, housing 30 may be provided in any suitable size and or shape to accommodate the components of the slide mechanism, and may be made from a variety of materials (e.g., plastic, metal, etc.). Further, according to an alternative embodiment, housing 30 may be integrally formed with the core material of the visor (e.g., injection molded, insert molded, etc.) rather than secured as a separate component. According to an exemplary embodiment, housing 30 includes a first member, or rib, 62, that is hot-plate-melted or otherwise secured to a corresponding second member, or rib, 64, on visor core 27, during assembly of the visor. Furthermore, according to any of these or other exemplary embodiments, other components may be included in the visor assembly and/or slide mechanism to suit other desired applications.

The construction and arrangement of the elements of the slidable visor assembly and slide mechanism and the methods for making the visor assembly and slide mechanism as shown in the exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied.

It should be noted that the elements and/or assemblies of the slidable visor assembly may be constructed from any of a wide variety of materials that provide sufficient strength or durability, including any of a wide variety of moldable plastic materials (such as high-impact plastic), or foams, polymers, etc. and in any of a wide variety of colors, textures, and combinations. The shape and size of the various components may be varied to improve the appearance, formability, and assembly of the visor assembly. Other substitutions, modifications, changes, and omissions may be made in the design, operating conditions, and arrangement of the exemplary embodiments without departing from the scope of the present inventions.

What is claimed is:

1. A visor assembly comprising:
   a visor body;
   a support rod; and
   a slide mechanism coupled to the visor body that slidably engages the support rod;
   wherein the slide mechanism comprises a slide member and a coil spring, the slide member having a plurality of extensions that are biased toward the support rod, the coil spring being arranged over at least a portion of the plurality of extensions to bias the extensions toward the support rod.

2. The visor assembly of claim 1 wherein the slide member comprises a keyed portion configured to prevent relative rotation between the slide member and the support rod.

3. The visor assembly of claim 2 wherein the slide member comprises a generally cylindrical portion and the keyed portion is provided on an interior portion of the cylindrical portion.

4. The visor assembly of claim 1 further comprising a detent spring coupled to the slide member and configured to rotate the visor body to a stowed position.

5. The visor assembly of claim 4 wherein the slide member comprises a metal portion configured to engage the detent spring and a plastic portion configured to engage the support rod.

6. The visor assembly of claim 4 further comprising a housing configured to couple the slide member and the detent spring to the visor body.

7. The visor assembly of claim 1 wherein the plurality of extensions define a recess configured to receive the coil spring.

8. A visor assembly comprising:
   a visor body;
   a support member having a support rod; and
   a slide mechanism coupled to the visor body and having a slide member configured to permit the visor body to slide along at least a portion of a length of the support rod,
   wherein the slide mechanism comprises a coil spring configured to bias at least a portion of the slide mechanism toward the support member and a detent spring configured to rotate the visor toward a stowed position.

9. The visor assembly of claim 8 wherein the slide member comprises a plurality of extensions extending therefrom, and the coil spring biases the extensions toward the support rod.

10. The visor assembly of claim 9 wherein the slide member is keyed relative to the support rod to prevent rotation of the slide member relative to the support rod.

11. The visor assembly of claim 8 further comprising a housing that couples the slide mechanism to the visor body.

12. A slide mechanism for a visor comprising:
    a slide member configured to slidably engage a support for a visor; and
    a housing configured to couple the slide member to a visor;
    wherein the slide member comprises a plurality of projections that are biased toward the support by a coil spring,
    wherein the slide member comprises a keyed portion configured to prevent rotation of the slide member relative to the support.

13. A slide mechanism for a visor comprising:
    a slide member configured to slidably engage a support for a visor; and
    a housing configured to couple the slide member to a visor;
    wherein the slide member comprises a plurality of projections that are biased toward the support by a coil spring, wherein the slide member comprises a generally cylindrical portion having opposing ends, and the plurality of projections extend from at least one of the opposing ends.

14. A visor assembly comprising:

a visor body;

a support member defining a longitudinal direction; and a slide mechanism coupled to the visor body configured to permit the visor body to slide along at least a portion of the support member in the longitudinal direction, the slide mechanism comprising a slide member that is rotationally fixed relative to the support member, the slide member comprising a keyed portion configured to prevent relative rotation between the slide mechanism and the support member, wherein the slide mechanism comprises a biasing member configured to bias at least a portion of the slide member toward the support member.

15. The visor assembly of claim 14 wherein slide member further comprises at least one extension, the at least one extension being the portion of the slide member that is biased toward the support member.

16. The visor assembly of claim 14 further comprising a detent spring coupled to the slide member and configured to rotate the visor body to a stowed position, the detent spring being rotatable relative to the support member and the slide member.

17. The visor assembly of claim 14 wherein the biasing member comprises a coil spring.

* * * * *